M. A. GARRETT.
ANGLE COCK SUPPORT FOR AIR BRAKE SYSTEMS.
APPLICATION FILED APR. 1, 1910.
960,889.
Patented June 7, 1910.
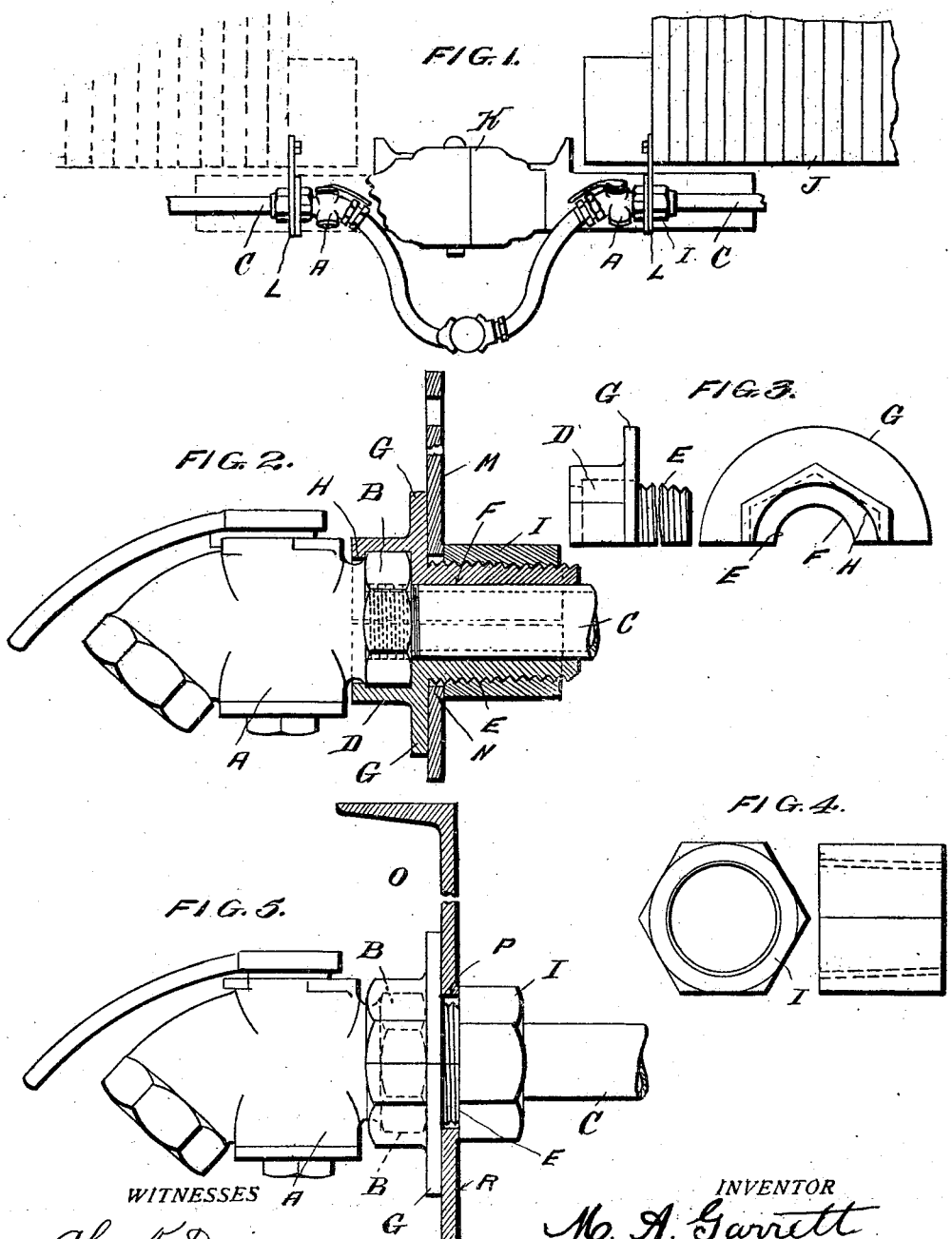
WITNESSES
Chas. N. Davies
Ralph Wormelle
INVENTOR
M. A. Garrett
By F. E. Stebbins, Attorney

UNITED STATES PATENT OFFICE.

MYERS A. GARRETT, OF CHICAGO, ILLINOIS.

ANGLE-COCK SUPPORT FOR AIR-BRAKE SYSTEMS.

960,889.  Specification of Letters Patent.   Patented June 7, 1910.

Application filed April 1, 1910. Serial No. 552,801.

*To all whom it may concern:*

Be it known that I, MYERS A. GARRETT, a citizen of the United States, residing at Chicago, in the county of Cook and State of Illinois, have invented certain new and useful Improvements in Angle-Cock Supports for Air-Brake Systems; and I do hereby declare the following to be a full, clear, and exact description of the invention, such as will enable others skilled in the art to which it appertains to make and use the same.

In air brake mechanism the angle cock has secured to one of its ends the flexible hose and coupling, and the other end is interiorly threaded to receive the exteriorly threaded end of the train pipe. The pipe is weakened to such a degree by the threads that should the angle cock be subjected to undue or excessive strains, as often happens, the pipe breaks at the place or circular line adjacent to its connection with the angle cock. Such breakage renders the air brake inoperative, the angle cock hose and coupling often are lost, and considerable expense for repairs becomes necessary. Further, the Master Car Builders' standards for the application of air brakes to cars specify the location of the train pipe and angle cock relative to the coupler and the angular disposition of the angle cock to a vertical plane, and it is desirable that they shall be held in their proper positions.

The object of my invention is, first, the provision of means constituting an improved connection or union of the angle cock and pipe which shall transmit and distribute the strains from the angle cock to the relatively strong part of the pipe back of the threaded end portion; and, secondly, the provision of means for holding the angle cock in its proper position on the car and relative to the coupler.

With these ends in view, my invention consists in certain novelties of construction and combinations and arrangements of parts as hereinafter set forth and claimed.

The accompanying drawing illustrates two examples of the physical embodiment of the invention constructed and arranged according to the best modes of procedure I have so far devised for the purpose.

Figure 1 is a side view in elevation of the ends of two coupled cars, one being in dotted lines, showing the train pipes and flexible hose couplings and my improved means for supporting the angle cock. Fig. 2 shows in side view an angle cock and pipe, and in section the means for supporting the same. Fig. 3 illustrates two views of one-half of the clamp. Fig. 4 shows two views of a clamping nut. Fig. 5 shows an angle cock clamped to the end sill of a car.

Referring to the first four figures, the letter A designates an angle cock of well known construction; B, the hexagon end interiorly threaded; C, the train pipe exteriorly threaded at the end; D, the clamp made in two similar parts, each part having an exteriorly tapered and threaded end E, a curved interior surface to fit the exterior surface of the train pipe F, a vertical flange G, an inwardly projecting flange H adapted to engage the edge of the hexagon of the angle cock and to occupy a position within the recess adjacent to the hexagon, and the interior surface between the parallel planes of the flanges G and H shaped to fit one-half the exterior surface of the hexagon B at the end of the angle cock so as to prevent the angle cock turning relative to the pipe; I, the clamping nut of hexagonal shape exteriorly to receive a wrench and also interiorly tapered and threaded; J, a car end; K, a coupler head; and L a hanger or support having a web M with a hole or slot N therethrough, the hanger or support in this instance being rigidly secured to a fixed part of the car by a bolt or bolts or by rivets.

The parts are assembled so they occupy the relative positions shown, the clamping nut surrounding the pipe and threaded end of the clamp back of the web M of the hanger, the pipe extending through the hole or slot N in the web, the angle cock screwed upon the end of the train pipe, the threaded end of the two part clamp engaging the pipe back of the web and the opposite end frictionally engaging the hexagon of the angle cock with the flange H within the recess in the angle cock adjacent the hexagon. When the clamping nut is turned and seated upon the end of the clamp its edge bears against the web of the hanger and the flange G frictionally engages the opposite surface of the web of the hanger so that all parts are held in fixed positions relative to the hanger and through the hanger to the car.

Obviously, the angle cock and end of the train pipe will retain their fixed positions relative to the car under all conditions of normal service, the angle cock cannot become unscrewed from the train pipe, and any strains imparted to the angle cock at an angle to the length of the train pipe will be transmitted to the hanger and car and to the train pipe back of the threaded end thereof.

In Fig. 5 the angle cock is shown supported by the end sill O of a car, which may be a channel beam, a hole P being made in the web R of the same to receive the pipe and clamp; and by the term "web" in this specification is meant any element fixed to the car or forming a part thereof which is clamped between the clamp and clamping nut in a manner substantially as herein set forth.

From the foregoing description and the illustrations it becomes evident that I have provided a very simple and effective air brake angle cock support which fulfils the conditions set forth as the objects of my invention.

What I claim is:

1. The combination with a car having an element provided with an opening, of an angle cock and a train pipe, a threaded clamp, and a threaded clamping nut; the clamp engaging the angle cock and the clamping nut surrounding the train pipe and engaging the threads of the clamp; the parts being so relatively disposed that the said element of the car is clamped between the clamp and the clamping nut when the nut is seated.

2. The combination with a car having an element provided with an opening, of an angle cock and train pipe, a threaded clamp formed in a plurality of pieces, and a threaded clamping nut; one end of the clamp engaging the angle cock and the opposite threaded end engaged by the threaded clamping nut; the element provided with an opening being clamped between the clamp and clamping nut.

3. The combination with a car having an element with an opening, of an angle cock and train pipe, the said angle cock having a flange at the end adjacent the pipe; a threaded clamp formed in a plurality of pieces; and a threaded clamping nut; one end of the clamp engaging the flange of the angle cock and the threaded end being engaged by the threaded clamping nut; the said element of the car being clamped between the clamp and clamping nut.

4. The combination in an air brake angle cock support, of a car; an angle cock angularly shaped exteriorly at one end; a train pipe secured to the angle cock; a clamp having one end in engagement with the angular end of the angle cock and the other end threaded and bearing against the train pipe; a threaded clamping nut on the pipe engaging the threaded end of the clamp; and means in connection with the car holding the angle cock and pipe in fixed position relative thereto.

5. The combination in an air brake angle cock support, of a car; an angle cock angularly shaped exteriorly at one end; a train pipe secured to the angle cock; a clamp formed in a plurality of pieces having one end in engagement with the angular end of the angle cock and the other end threaded and bearing against the train pipe; a threaded clamping nut on the pipe engaging the threaded end of the clamp; and means in connection with the car holding the angle cock and train pipe in fixed position relative thereto.

6. The combination with an angle cock at one end interiorly threaded and angularly shaped exteriorly, of a clamp formed in a plurality of parts with one end engaging the angularly shaped exterior of the angle cock and the other end exteriorly threaded; a threaded clamping nut on the pipe engaging the threaded end of the clamp; and an element in connection with a car supporting the angle cock train pipe and clamping means in a fixed position realtive to the car.

7. The combination with an angle cock interiorly threaded and having an exterior flange, of a threaded train pipe, a clamp formed in a plurality of parts, one end having a flange engaging the flange of the angle cock and the opposite end threaded, a threaded clamping nut on the pipe engaging the threaded end of the clamp; and means for supporting said angle cock pipe and clamping elements in fixed position relative to the car.

8. The combination with an element in connection with a car, said element having a web, of an angle cock and train pipe, a threaded clamp, and a threaded clamping nut; the clamp engaging the angle cock and web and the clamping nut screwed on the clamp and also engaging the web.

9. The combination with an element in connection with a car, said element having an opening, of an angle cock and train pipe, a threaded clamp formed in a plurality of pieces, and a threaded clamping nut; the clamp engaging the angle cock and element in connection with the car and the clamping nut screwed on the clamp and also engaging the said element.

10. Clamping means for uniting an angle cock and train pipe comprising a clamp formed in a plurality of pieces the interior surface thereof at one end angularly shaped and the opposite end exteriorly threaded, and a clamping nut interiorly threaded and angularly shaped exteriorly and adapted to engage the threaded end of the clamp.

11. Clamping means for uniting an angle cock and train pipe comprising a clamp formed in a plurality of pieces the interior surface thereof at one end shaped to fit the angle cock, the opposite end exteriorly threaded and with an intermediate exterior flange at right angles to the longitudinal axis of the clamp, and a clamping nut interiorly threaded and angularly shaped exteriorly and adapted to engage the threaded end of the clamp.

12. In a device of the character described, the combination of a train pipe and angle cock, a support mounted on the car frame and having a bearing for the pipe, and a pair of threaded members coöperating with said pipe and angle cock and adapted to be screwed one upon the other against opposite sides of said support to maintain said pipe and angle cock against displacement.

13. Clamping means for uniting an angle cock and train pipe comprising a clamp formed in a plurality of pieces the interior surface thereof at one end shaped to fit the angle cock, the opposite end exteriorly tapered and threaded and with an intermediate exterior flange, and a clamping nut interiorly tapered and threaded and adapted to engage the threaded end of the clamp.

In testimony whereof I affix my signature, in the presence of two witnesses.

MYERS A. GARRETT.

Witnesses:
MAUD C. STEBBINS,
N. B. MACHATTON.